United States Patent [19]

Luhowy

[11] 3,817,105
[45] June 18, 1974

[54] PORTABLE DIGITAL TEMPERATURE METER
[75] Inventor: Gabriel J. Luhowy, Lima, N.Y.
[73] Assignee: Transmation, Inc., Rochester, N.Y.
[22] Filed: Oct. 4, 1972
[21] Appl. No.: 294,838

[52] U.S. Cl. .......................................... 73/362 AR
[51] Int. Cl. ............................................ G01k 7/00
[58] Field of Search ...................... 73/362 AR, 359; 340/347 AD; 235/92 MT, 151.3

[56] References Cited
UNITED STATES PATENTS
3,274,832  9/1966  Hamilton .............................. 73/339
3,349,390  10/1967  Glassman ..................... 340/347 AD
3,477,292  11/1969  Thornton ....................... 73/362 AR Primary Examiner—Donald O. Woodiel
Attorney, Agent, or Firm—Jay M. Cantor

[57] ABSTRACT

The disclosure relates to a portable digital temperature meter of small size and long term stability capable of accurate temperature measurement in the fever thermometer range with long term battery life capability.

11 Claims, 3 Drawing Figures

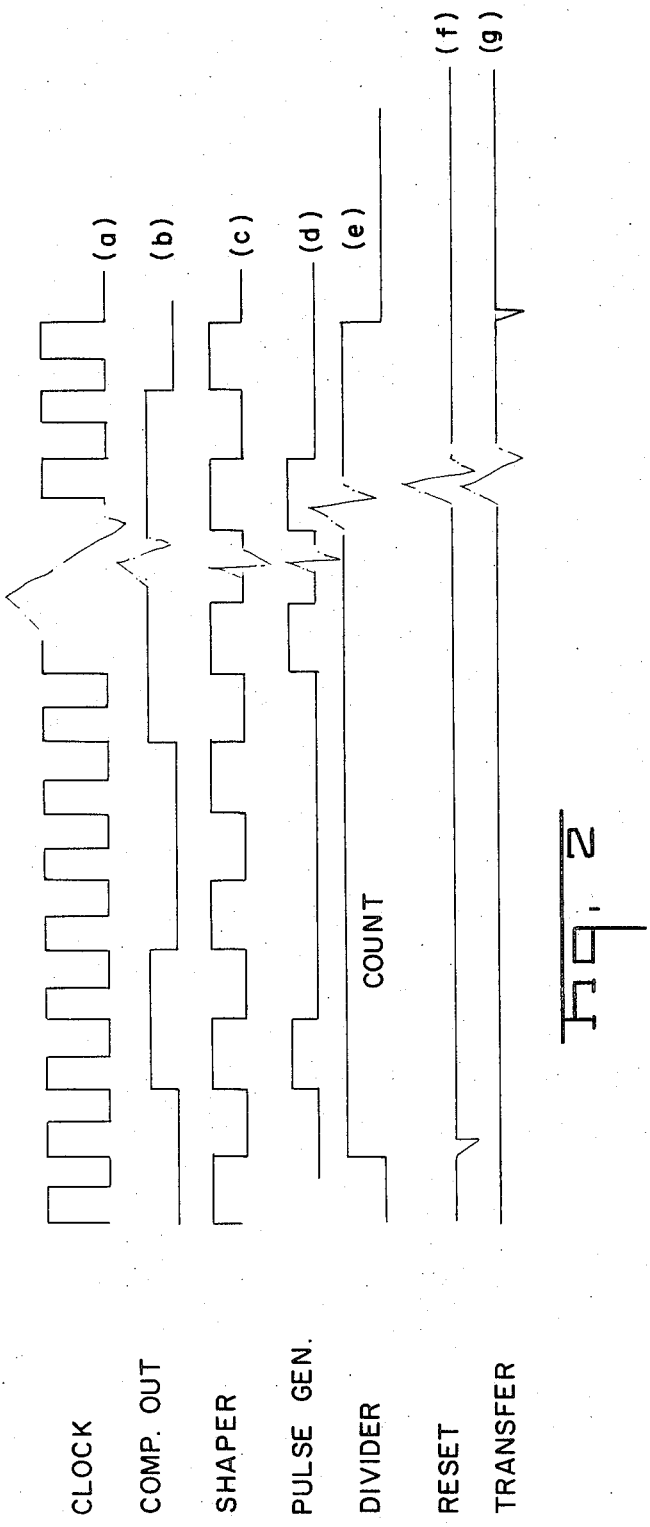

PORTABLE DIGITAL TEMPERATURE METER

This invention relates to a portable digital temperature meter and, more specifically, to a portable digital temperature meter using a digital volt meter.

Electronic temperature meters have found extensive use in hospitals and the like as a replacement for the well known fever thermometer due to their relative speed in determining body temperature relative to the prior art fever thermometers as well as for sanitary considerations. The prior art electronic thermometers of the type described above, however, have been subject to increasing inaccuracy due to battery deterioration, have been relatively bulky and have demonstrated relatively poor battery life.

In accordance with the present invention, the above problems of the prior art are overcome and there is provided a portable temperature meter which is relatively small, demonstrates relatively long battery life and has high accuracy, even with battery deterioration.

It is therefore an object of this invention to provide a portable temperature meter of relatively small size which has relatively long battery life and provides accurate readings even with relatively deteriorated batteries.

Figure 1:
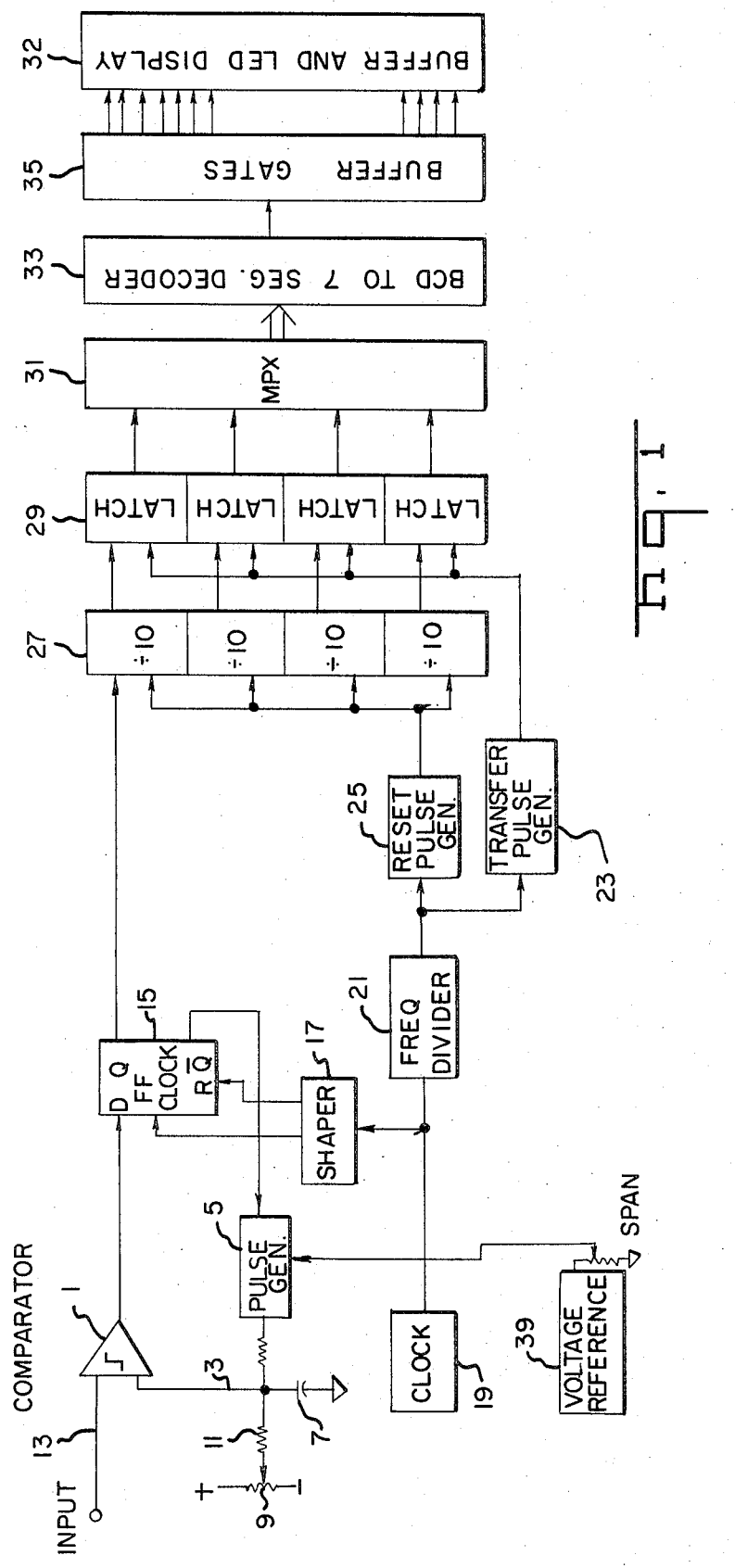
Figure 7:
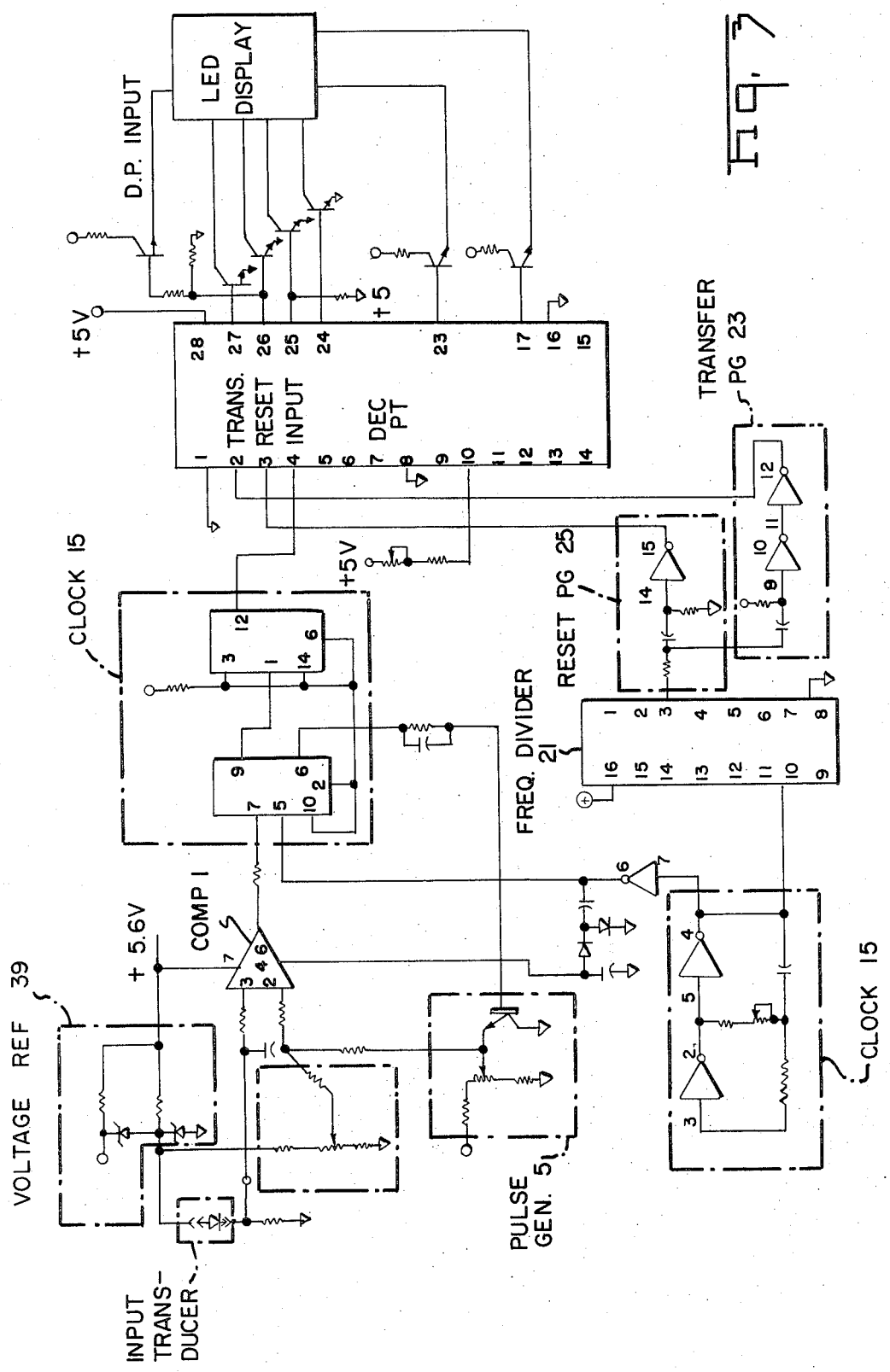

The above object and still further objects of the invention will immediately become apparent to those skilled in the art after consideration of the following preferred embodiment thereof, which is provided by way of example and not by way of limitation wherein:

FIG. 1 is a block diagram of the temperature meter in accordance with the present invention;

FIGS. 2(a) through 2(g) are timing diagrams for the circuit of FIG. 1; and

FIG. 3 is a detailed circuit diagram of the circuit of FIG. 1.

Referring first to FIG. 1, there is shown a block diagram of the temperature meter in accordance with the present invention. The circuit includes a comparator 1 having a zero input 3 taken from a pulse generator 5 having a voltage reference circuit 39 which feeds said input 3 as well as an integrating capacitor 7. A zeroing circuit is also provided including a potentiometer 9 and resistor 11. The other input 13 to the comparator 1 is the input voltage from a transducer which is converting the temperature being measured into a voltage.

When the input 13 has a higher voltage than input 3, the output of the comparator 1 is high and permits the clock 15, which is a flip-flop, to change state at every positive going pulse thereto from a shaper 17 which is fed by a clock 19. The flip-flop 15 is reset by a complementary output from the shaper 17.

The output from the clock 19 also is divided in binary divider 21, the divider providing pulses to the transfer pulse generator 23 and reset pulse generator 25. The transfer pulses operate the latches 29 whereas the reset pulses reset the dividers 27. The dividers 27 are fed by the flip-flop 15, the dividers in turn feeding the latches 29. The output of the latches 29 is fed to a multiplex unit 31, the output thereof being converted in converter 33 from binary coded decimal to a seven segment code. The output of converter 33 is fed through buffers 35 to a display 37 which can be, for example, a light emitting diode (LED) display having seven segments per digit. Of course, a liquid crystal display could also be used.

Since the clock 19 is common to the timing function of the circuit as well as to the operation of flip-flop 15, excursions in the frequency of clock 19 are cancelled out and only the number of clock pulses fed into the divider chain is important. The comparator 1 will change state when the voltage across the integrating capacitor 7 exceeds the voltage on input 13, thus preventing flip-flop 15 from changing state and generating more pulses in the pulse generator 1. The frequency of the clock 19 is made such that the period of the binary divider 27 is related to the period of line frequency, thereby reducing line voltage errors by integration. The clock 19 may be synchronized to the line frequency to provide the above.

In operation, an input voltage from a transducer which is proportional to a temperature being measured is applied to the input 13 of comparator 1. When this input voltage is greater than the voltage on input 3, an output is provided by comparator 1, causing the flip-flop 15 to toggle at the rate determined by the clock 19 input thereto through shaper 17. The clock 19 output is shown in FIG. 2(a) and the comparator output in FIG. 2(b) and the shaper 17 output in FIG. 2(c). For each toggling cycle of flip-flop 15, a pulse is fed to the divider or decade counter 27 (to be explained later) as well as to the pulse generator 5. The output of the pulse generator 5 is shown in FIG. 2(d). The output of pulse generator 5 is fed to integrating capacitor 7 and charges said capacitor with each such pulse until the voltage on capacitor 7 is equal to the input voltage on input 13. At this point, flip-flop 15 ceases operation because there is no longer a priming input thereto from comparator 1. If, during a single cycle of operation, the capacitor 7 should discharge sufficiently so that the voltage thereon is less than that on input 13, the flip-flop 15 can commence operation again.

A single cycle of operation of the system is determined by counter or frequency divider 21. The counter 27 is set to receive a predetermined number of pulses from clock 19 whereupon the transfer pulse generator 23 and reset pulse generator 25 are operated. The time required to receive the said predetermined number of pulses is a single cycle of operation. The output of the counter 22 is shown in FIG. 2(e). At the beginning of a cycle of operation, a pulse is sent from the generator 25 as shown in FIG. 2(f) to the decade counters 27 and resets the decade counters to zero. At the end of a cycle of operation, a pulse is sent from the generator 23 as shown in FIG. 2(g) to transfer the contents of the counters 27 to the latches 29. During the cycle of operation, the output of flip-flop 15 is fed to decade counters 27 and is counted therein. It can therefore be seen that the number of pulses provided to counter 27 from flip flop 15 will be in direct proportion to the voltage at input 13 and therefore in direct proportion to the temperature being measured. The count in counters 27 will be displayed on display 37 in the manner described above.

Referring now to FIG. 3, there is shown a detailed circuit diagram of the circuit of FIG. 1 with all circuit elements set forth therein.

Though the invention has been described with respect to a specific preferred embodiment thereof, many variations and modifications will immediately become apparent to those skilled in the art. It is therefore the intention that the appended claims be interpreted as

What is claimed is:

1. A digital temperature meter comprising:
means for producing a first voltage proportional to a temperature to be measured,
means providing a second voltage,
means for comparing said first voltage with said second voltage and providing an output when the first voltage is of greater magnitude than the second voltage,
means for transmitting clock pulses from a source of such pulses,
means controlled by the output of the comparing means and said clock pulses for recurrently increasing the magnitude of the second voltage by equal voltage increments unti it is equal in magnitude to said first voltage,
and means for counting the increments, the number of such increments being a measure of said temperature.

2. A digital temperature meter according to claim 1 wherein the means controlled by the output of the comparing means and said clock pulses produces a digital output signal corresponding to each voltage increment.

3. A meter as set forth in claim 2 wherein the means for counting the increments comprises a counter for counting said digital output signals and means responsive to a predetermined number of said clock pulses for transferring the count in said counter and then resetting said counter.

4. A meter as set forth in claim 3 further including means to store the transferred output of said counter.

5. A meter as set forth in claim 4 further including a converter means responsive to said stored output for converting said output to a seven segment code.

6. A meter as set forth in claim 5 further including a light emitting diode display responsive to the output of said converter means.

7. A meter as set forth in claim 5 further including a liquid crystal display responsive to the output of said converter means.

8. A digital temperature meter according to claim 1 wherein the second voltage source comprises, integrating means responsive to the output of the comparing means as controlled by the clock pulses to provide an integral of said voltage increments.

9. A digital temperature meter according to claim 8 wherein the means controlled by the output of the comparing means and said clock pulses produces a digital output signal corresponding to each voltage increment.

10. A meter as set forth in claim 9 wherein said integrating means comprises an integrating capacitor and a resistor coupled between said capacitor and a reference voltage.

11. A meter as set forth in claim 9 wherein the means for counting the increments comprises a counter for counting said digital output signals and means responsive to a predetermined number of said clock pulses for transferring the count in said counter and then resetting said counter.

* * * * *